United States Patent [19]

Inoue et al.

[11] Patent Number: 5,286,784
[45] Date of Patent: Feb. 15, 1994

[54] POLY(PHENYLENE SULFIDE) RESIN COMPOSITION

[75] Inventors: Hiroshi Inoue; Toshikazu Kato; Takehiko Sakane; Masanori Fujioka, all of Mie, Japan

[73] Assignees: Tosoh Corporation, Yamaguchi; Toso Susteel Co., Ltd., Tokyo, both of Japan

[21] Appl. No.: 974,343

[22] Filed: Nov. 10, 1992

Related U.S. Application Data

[63] Continuation of Ser. No. 550,582, Jul. 10, 1990, abandoned.

[30] Foreign Application Priority Data

Jul. 10, 1989 [JP] Japan .................. 1-175538

[51] Int. Cl.⁵ .............................................. C08L 81/00
[52] U.S. Cl. ...................................... 524/609; 524/425
[58] Field of Search ........................................... 524/609

[56] References Cited

U.S. PATENT DOCUMENTS

| | | |
|---|---|---|
| 3,354,129 | 11/1967 | Edmonds et al. |
| 3,793,256 | 2/1974 | Scoggin et al. |
| 3,839,301 | 10/1974 | Scoggins ............... 525/537 |
| 4,451,601 | 5/1984 | Blackwell ............. 524/609 |
| 4,839,411 | 6/1989 | Hoover et al. ......... 524/609 |
| 4,960,813 | 10/1990 | Wadhwa et al. ....... 524/609 |
| 4,992,497 | 2/1991 | Wright ................... 524/609 |
| 5,049,446 | 9/1991 | Blackwell et al. ..... 524/609 |

FOREIGN PATENT DOCUMENTS

| | | |
|---|---|---|
| 0272812 | 6/1988 | European Pat. Off. |
| 0309916 | 4/1989 | European Pat. Off. |
| 453368 | of 1970 | Japan |
| 1-121327 | 5/1989 | Japan |

*Primary Examiner*—Robert E. Sellers
*Assistant Examiner*—Mark D. Sweet
*Attorney, Agent, or Firm*—Sughrue, Mion, Zinn, Macpeak & Seas

[57] ABSTRACT

A poly(phenylene sulfide) resin composition less liable to discoloration and exhibiting excellent ductilities is provided. The composition comprises a poly(phenylene sulfide) resin pre-cured in a non-oxidative, inert gas atmosphere and a fibrous glass reinforcement exhibiting a very low weight loss on heating. The poly(phenylene sulfide) resin has, before curing, a melt viscosity of greater than about 400 poises at 300° C.

10 Claims, No Drawings

POLY(PHENYLENE SULFIDE) RESIN COMPOSITION

This is a continuation of application No. 07/550,582 filed Jul. 10, 1990, now abandoned.

This invention relates to a poly(phenylene sulfide) resin composition, in particular a composition less liable to discoloration and exhibiting excellent ductilities.

Poly(phenylene sulfide) materials have excellent heat and chemical resistance properties and, hence, have attracted a good deal of attention as materials useful for producing parts in electrical and electronic instruments, automotive parts and the like. Poly(phenylene sulfide) materials may be formed or molded, for example by injection or extrusion molding techniques into various molded parts, films, sheets, fibers and the like. These molded products have been used in applications where high heat and chemical resistance properties are required.

Poly(phenylene sulfide) resins are polymers containing main structural units of the formula:

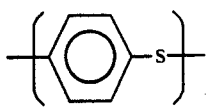

in the polymeric chain. A method of production of the polymers is disclosed, for example, in Japanese Patent Publication (KOKOKU) No. 45-3368, which method comprises heating and reacting a dihaloaromatic compound with an alkali metal sulfide in a polar aprotic solvent. However, the poly(phenylene sulfide) polymer (referred to as PPS hereinafter) prepared by the known method has such a low molecular weight that the prepared polymer cannot be successfully used in molding applications such as injection molding. Thus, in order to solve the problem, for example U.S. Pat. No. 3,793,256 discloses a method for increasing the molecular weight of PPS by curing the polymer through oxidation in air. However, the cured PPS material resulting from the oxidative curing method exhibits pronounced discoloration, possibly, due to the excessive oxidation-crosslinking reaction which has been caused to occur by the presence of oxygen. The thus cured PPS provides only brittle moldings and shapings, even if it is reinforced with reinforcing materials such as glass fibers. Therefore, the cured product is unsatisfactory due to the problems as above-mentioned.

The present invention provides a PPS composition having minimum discoloration and excellent ductilities and which comprises a cured PPS and specific glass fibers, said PPS having, before curing, a melt viscosity of not less than 400 poises and having been cured in a non-oxidative, inert gas.

Accordingly, the invention concerns a PPS composition which comprises 100 parts by weight of PPS that has been cured by heating in a non-oxidative, inert gas a temperatures within the range of from about 200° C. to about 270° C., and 10–200 parts by weight of glass fibers exhibiting a weight loss of not greater than 0.7% by weight, said PPS having, before curing, a melt viscosity of not less than about 400 poises as measured in a KOHKA type flow tester at a temperature of 300° C. and a load of 10 kg using a die of 0.5 mm diameter and 2 mm length.

The invention also concerns a method for preparing such an improved PPS composition.

In order to obtain a PPS composition having a reduced degree of discoloration and excellent ductilities according to the invention, a PPS having a melt viscosity of not less than 400 poises (as measured by the above-defined method) must be cured in a non-oxidative, inert gas. Though the principle of the curing process according to the invention has not been well elucidated, possibly the excessive oxidation-crosslinking reaction which is caused to occur by oxygen during the conventional curing in air is suppressed in the non-oxidative atmosphere and removal of the volatiles, such as oligomers, in the PPS material as well as an increase in the molecular weight of PPS occur so that a PPS composition is produce with a reduce degree of discoloration and enhanced ductilities.

The PPS material to be used in the present invention should exhibit a melt viscosity of greater than 400 poises prior to curing (as measured by the above-defined method). Where a PPS material having a melt viscosity of less than 400 poises is cured in an inert gas, a PPS composition improved in the ductilities would not be produced, possibly as such a material has a molecular weight which is too low.

Examples of the inert gases which may be used in the invention include helium, argon, nitrogen, carbon dioxide, steam and the like and mixtures thereof, and the use of nitrogen is preferred from the point of view of cost efficiency. An oxygen concentration of less than about 1% by volume in the inert gas is acceptable in practice since the oxidation-crosslinking which may be caused to occur in the presence of such a low level of oxygen is negligible.

The temperature range in which the thermal curing is effected in the present invention is preferably from about 200° C. to about 270° C. Within the temperature range, the PPS material remains in the solid powder form and can be effectively cured under the non-oxidative atmosphere in an apparatus similar to conventional oxidative curing apparatus, such as ribbon blender and various other blenders and fluidized bed systems.

If the curing temperature is lower than about 200° C., the volatiles such as oligomers may not be effectively removed and the curing reaction may proceed only at a reduced rate. Therefore, use of such a low curing temperature is not preferred. On the other hand, if a temperature above about 270° C. is employed in the curing process, the particulate PPS material will melt to provide a molten mass that exhibits a significantly reduced surface area in comparison with where the material is in powder form and, thus, the effective removal of volatiles such as oligomers from the molten mass will be substantially inhibited due to the reduced surface area. Furthermore, the molten PPS material will adhere to the interior walls of the curing apparatus, and hence discharge of the treated PPS from the curing apparatus, cleaning and purging of the interior of the apparatus and other similar operations may be considerably retarded by the adhering material. In view of these difficulties, curing of the PPS material at temperatures above about 270° C. is not preferred.

The period of curing time used in the present invention is not critical but should be sufficient to achieve a desired or intended level of curing. Suitably, the period of curing time will fall in the range of about 10 minutes up to about 24 hours.

It is preferred that the glass fibers which are used as fibrous reinforcement exhibit a weight loss of not greater than 0.7% by weight when heated at 330° C. for 1 hour. Though it has not been accurately elucidated as to why the loss of weight on heating is an important factor, it is believed that use of the glass fibers exhibiting a low weight loss results in evolution of gases in a reduced amount during molding of the PPS composition and that the V-notches or defects which may be left in or on the weld surface by the gas bubbles involved in the molten material are significantly reduced in number and the ductilities such as weld strength of the molded products are improved.

Further, though it is not understood in detail why the ductilities of molding are significantly improved by combination of the glass fibers of the specified weight loss property with the PPS cured in an inert gas atmosphere, there may be mentioned a hypothesis that when the PPS is cured in an inert gas, the functional groups positioned at the ends of polymer chains and which, if subjected to the curing conditions in air would deteriorate, avoid such a deterioration by effecting the curing process in an inert gas atmosphere, and therefore the surviving functional groups effectively contribute to formation of a good interfacial adhesion between the polymer molecules and glass fibers.

The effectiveness of the invention does not appear to be affected whether or not the glass fibers have been subjected to surface treatments or by the nature of binders that are used for the glass fiber reinforcement. Therefore, the glass fibers used in the invention may be either one which has not been subjected to surface treatment or one which has been subjected to surface treatment using a conventional surface treatment agent such as a silane coupling agent (e.g. an aminosilane), titanate coupling agent and the like. Though any binder may be used for the glass fibers, in order to effect a minimum weight loss in the glass fibers on heating, it is preferred to use a thermally stable binder. Though the quantity of binder loaded on the glass fibers is not critical, it is desirable to minimize the loadings so as to reduce the weight loss on heating, providing the handling properties of glass fibers are not adversely affected by the minimized loadings of binder. The diameter of glass fiber is suitably from about 4 to 20 μm, preferably from about 5 to 15 μm.

Preferably the content of glass fibers used in the present composition ranges from about 10 to about 200 parts by weight per hundred parts by weight of PPS. A content of glass fibers of less than about 10 parts by weight is not preferred, because insufficient reinforcement is achieved with such a low glass fiber content. Furthermore, no significant improvements in the heat resistance and ductilities are achieved with such a low glass fiber content. On the other hand, a glass fiber content in excess of about 200 parts by weight creates difficulty in the preparation of the composition and gives rise to a poor fluidity of the composition when used in molding and, thus, is not preferred in practice.

The PPS material that is cured to be used in the present composition should comprise about 70 mole % or more of structural units represented by:

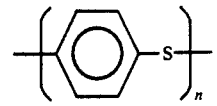

The PPS material may comprise about 30 mole % or less of other copolymerized structural units, for example m-phenylene sulfide units

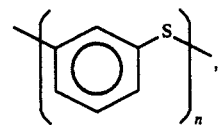

o-phenylene sulfide units

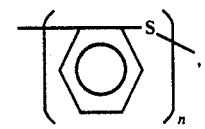

phenylene sulfide sulfone units

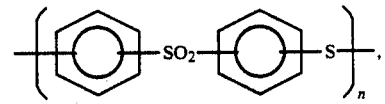

phenylene sulfide ketone units

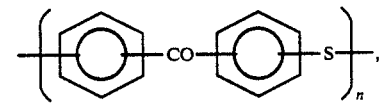

phenylene sulfide ether units

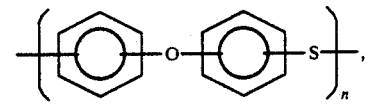

dephenylene sulfide units

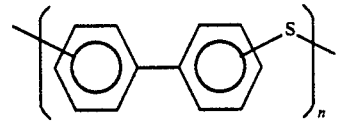

and the like. Provided that the linearity of the PPS polymer is not significantly disturbed, a minor proportion of a monomer or monomers having three or more halogen atoms in the molecule(s) may be copolymerized in the preparation of polymer so as to give a PPS product containing a minor degree of branching and/or crosslinking, which may be used in the present invention.

In order to obtain the PPS composition having excellent ductilities according to the invention, the PPS materials used should have a melt viscosity of not less than about 400 poises as measured in a KOHKA type flow tester at a temperature of 300° C. and a load of 10 kg using a die of 0.5 mm diameter and 2 mm length. The PPS material of the specified viscosity property is cured in an inert atmosphere to attain an increased melt viscosity, preferably in the range of about 500–20,000 poises.

In addition to the PPS material, the present composition may comprise another blended polymer or polymers depending on the intended specific application of the composition.

Particular examples of the polymers which may be blended in the composition include homopolymers such as polyethylene, polybutadiene, polyisoprene, polychloroprene, polystyrene, polybutene, poly α-methylstyrene, polyvinyl acetate, polyvinyl chloride, polyacrylates, polymethacrylates, polyacrylonitrile, polyamides (e.g. nylon 6; nylon 6,6; nylon 6,10; nylon 12; nylon 11; nylon 4,6 etc.), polyesters (e.g. polyethylene terephthalate, polybutylene terephthalate, polyarylates, etc.), polyurethanes, polyacetals, polycarbonates, polyphenylene oxide, polysulfones, polyether sulfones, polyaryl sulfones, polyphenylene sulfide sulfones, polyether ketones, polyether ether ketones, polyphenylene sulfide ketone, polyimides, polyamide imides, silicone resins, phenoxy resins, epoxy resins, fluorine resins and the like; random, block or graft-copolymers; and mixtures thereof.

Inorganic fillers other than glass fibers may be optionally added to the composition, for example, in order to improve or modify the mechanical, thermal, electrical and other properties depending on the final application thereof. Examples of the inorganic fillers which may be used include reinforcing fillers such as ceramic fibers (e.g. carbon, alumina and the like fibers), metallic fibers and whiskers (e.g. of potassium titanate); calcium carbonate, mica, talc, silica, barium sulfate, calcium sulfate, kaolin, clay, pyroferrite, bentonite, sericite, zeolite, nepheline syenite, attapulgite, wollastonite, ferrites, calcium silicate, magnesium carbonate, dolomite, antimony trioxide, zinc oxide, titanium oxide, magnesium oxide, iron oxides, molybdenum disulfide, graphite, gypsum, glass beads, powdered glass, glass balloons, quartz, quartz glass, and mixtures thereof. Organic fibrous fillers, for example aramide and wholly aromatic polyester fibers, having melting points higher than the temperatures at which the PPS composition is subjected to molding process may also be incorporated in the composition.

Further, conventional additives, for example, plasticizers (arylene hydroxy derivatives, etc.), mold release agents, silane or titanate coupling agents, lubricants, heat stabilizers, weathering agents, nucleating agents, blowing agents, rust-proofing agents, ion-trapping agents, flame-retardants, flame-proofing aids and organic or inorganic pigments may also be incorporated, if desired.

The present PPS resin composition may be prepared by any conventional technique. For example, the necessary components are blended or mixed together and the mixture is pelletized through a single or twin-screw extruder before use in molding applications.

EXAMPLE

The invention will be illustrated in more detail with reference to the following non-limiting Examples.

Preparation of the PPS materials that were used in the Examples including Comparative Examples is described in the Reference Examples below.

Reference Example 1

A 530 l capacity reactor vessel provided with a stirrer, a dehydration column and a jacket was charged with 110 l of N-methyl pyrrolidone (NMP) and 61.1 kg of sodium sulfide (a purity of 60.2 wt % $Na_2S$). With stirring, the contents were heated by means of the jacket while withdrawing water from the system through the dehydration column until an interior temperature of about 200° C. was attained. During this heating-up stage, a distillate comprising mainly of water was removed in a quantity of 13.5 l. Into the reactor vessel, 68.7 kg of p-dichlorobenzene and 48 l of N-methyl pyrrolidone were added. The mixture was heated up to 225° C. over a period of 2 hours and allowed to react for a further 2 hours at 225° C., and thereafter heated up to 250° C. over a period of 30 minutes and allowed to react for a further 3 hours at 250° C. During the heat-up and reaction stage, the pressure rose to 10.5 kg/cm$^2$.

After the reaction was finished, the reaction mixture was transferred into a solvent recovering vessel provided with a stirrer, a jacket and a vacuum line. Then, 30 l of N-methyl pyrrolidone was added to the mixture. Thereafter, the mixture was heated at reduced pressure so as to remove a distillate comprising mainly of N-methyl pyrrolidone in an amount of 210 . To the residue, 200 l of water was added to give an aqueous slurry, which was stirred for 15 minutes at 80° C. Then the product polymer was centrifugally recovered from the slurry.

The recovered polymer was returned to the solvent recovering vessel to which 200 l of water was added. The mixture was then heated to 100° C. with stirring for 30 minutes. After cooling, a powdery polymer product was centrifugally recovered. This washing-separation procedure was repeated a further two times.

The resulting polymer was transferred to a jacketed ribbon blender and dried therein. A sample taken from the dried PPS showed a melt viscosity of 570 poises as measured at 300° C. and a load of 10 kg in a KOHKA type flow tester (with a die of 0.5 mm diameter and 2 mm length). The PPS produced in this Reference Example will be referred to as PPS-I.

REFERENCE EXAMPLE 2

To prepare another PPS material, the general procedure of Reference Example 1 was repeated except that, when the reaction mixture had been raised to 250° C. (from 225° C.), 260 g of 1,2,4-trichlorobenzene was added together with 10 l of NMP. The resulting polymer had a melt viscosity of 1550 poises. This PPS product will be referred to as PPS-II.

REFERENCE EXAMPLE 3

To prepare a further PPS material, the general procedure of Reference Example 1 was repeated except that the p-dichlorobenzene was used in an amount of 70.0 kg and that the reaction mixture was raised to 250° C. (from 225° C.) over a period of 1 hour and 20 minutes and allowed to polymerized for a further 3 hours. The resulting polymer had a melt viscosity of 270 poises. This PPS product will be referred to as PPS-III.

EXAMPLE 1

A sample of PPS-I was charged in a 150 l capacity ribbon blender and, with agitating, cured for 10 hours at a raised temperature of 230° C. in a stream of nitrogen at a flow rate of 400 l/hr. After curing, the polymer showed a melt viscosity of 1500 poises and a whiteness of 76 with a slight discoloration. In a V-blender, 100 parts by weight of the cured polymer was mixed with 67 parts by weight of glass fibers (3 mm long chopped strand) that showed a weight loss of 0.2% by weight when heated to 330° C. for 1 hour (hereinafter referred to as "weight loss on heating"). Thereafter, the mixture was kneaded and extruded through an extruder to give pellets. In an injection molding machine, the pellets were formed into specimens. According to the test method of ASTM D638, a tensile weld-strength was 845 kg/cm². The results are summarized in Table 1.

EXAMPLE 2

The procedure as described in Example 1 was repeated except that glass fibers showing a weight loss of 0.4 wt % on heating were used. The results are summarized in Table 1.

EXAMPLE 3

The procedure as described in Example 1 was repeated except that PPS-II was employed in place of PPS-I and cured under a nitrogen atmosphere at 250° C. for 5 hours and glass fibers showing a weight loss of 0.4 wt % on heating were used. The results are summarized in Table 1.

EXAMPLE 4

The procedure as described in Example 1 was repeated except that PPS-I was cured in a nitrogen atmosphere at 230° C. for 6 hours and that 100 parts by weight of glass fibers showing a weight loss of 0.4 wt % on heating and 86 parts by weight of calcium carbonate were used. The results are summarized in Table 1.

COMPARATIVE EXAMPLE 1

The procedure as described in Example 1 was repeated except that the polymer was cured in air at 250° C. for 2 hours and that glass fibers showing a weight loss of 0.9 wt % on heating were used. The cured polymer had a whiteness of 37 and exhibited a pronounced discoloration in comparison with those that were obtained in the Examples where the polymers were cured under nitrogen atmosphere. A specimen formed from the composition exhibited a weld strength of 570 kg/cm² lower than the values achieved in the corresponding Examples (see Table 1).

COMPARATIVE EXAMPLE 2

The procedure as described in Example 1 was repeated except that glass fibers showing a weight loss of 0.9 wt % on heating were used. Though the cured polymer showed an excellent whiteness of 76, a specimen formed from the composition showed a weld strength as low as 560 kg/cm².

It can be seen that employment of glass fibers that show an increased weight loss on heating tends to lead to a decreased weld strength (see Table 1).

COMPARATIVE EXAMPLE 3

PPS-II was used as a PPS material and cured in air at 250° C. for 2 hours. The cured polymer had been heavily discolored and showed such an increased melt viscosity that it was impossible to determine the viscosity under the above-defined conditions.

The cured polymer was mixed with glass fibers that showed a weight loss of 0.4 wt % on heating. The mixture was fed to an extruder for pelletizing, but no satisfactory pellets were obtained due to the excessively increased melt viscosity (see Table 1).

COMPARATIVE EXAMPLE 4

The procedure as described in Example 1 was repeated except that PPS-II was used as a PPS material but was not cured and that glass fibers showing a weight loss of 0.4 wt % on heating were used. The polymer showed an excellent whiteness of 85. The specimen formed of the composition showed a low weld strength of 580 kg/cm².

It can be seen that no satisfactory increase in weld strength is achievable without curing the polymer in an inert gas atmosphere (see Table 1).

COMPARATIVE EXAMPLE 5

The procedure as described in Example 1 was repeated except that the polymer was cured in air at 230° C. for 6 hours and that 100 parts by weight of glass fibers showing a weight loss of 0.9 wt % on heating and 86 parts by weight of calcium carbonate were used. The cured polymer showed a whiteness as low as 38 and had been more heavily discolored as compared to those of Examples 1–4. The specimen formed from the composition showed a lower weld strength of 370 kg/cm² as compared with that attained in Example 4 (see Table 1).

COMPARATIVE EXAMPLE 6

The procedure as described in Example 4 was repeated except that PPS-III was used as a PPS material. The cured polymer had an excellent whiteness of 77. However, the specimen formed from the composition showed a weld strength as low as 360 kg/cm². Thus, it can be seen that, where the polymer has a melt viscosity lower than the specified minimum value before curing, the article formed from the final composition shows no significant improvement in weld strength (see Table 1).

TABLE 1

| | PPS material | Curing conditions Atmosphere | Curing conditions Temp. (°C.) | Curing conditions Time (hr) | Melt viscosity before curing (poise) | Melt viscosity after curing (poise) | Whiteness | Amounts of PPS used (parts by weight) | Glass fibers Weight loss on heating (% by weight) | Glass fibers Amounts added (parts by weight) | Amounts of calcium carbonate added (parts by weight) | Tensile weld-strength (kg/cm²) |
|---|---|---|---|---|---|---|---|---|---|---|---|---|
| Ex. 1 | PPS-I | Nitrogen | 230 | 10 | 570 | 1500 | 76 | 100 | 0.2 | 67 | 0 | 845 |
| 2 | " | " | " | " | " | " | " | " | 0.4 | " | " | 750 |
| 3 | PPS-II | " | 250 | 5 | 1550 | 4370 | 72 | " | " | " | " | 720 |
| 4 | PPS-I | " | 230 | 6 | 570 | 890 | 77 | " | " | 100 | 86 | 480 |
| Comp. Ex. 1 | PPS-I | Air | 250 | 2 | 570 | 3040 | 37 | " | 0.9 | 67 | 0 | 570 |
| 2 | " | Nitrogen | 230 | 10 | " | 1500 | 76 | " | " | " | " | 560 |
| 3 | PPS-II | Air | 250 | 2 | 1550 | Not measured due to excessively high | 31 | " | 0.4 | " | " | — 1) |

TABLE 1-continued

| | PPS material | Curing conditions Atmosphere | Curing conditions Temp. (°C.) | Curing conditions Time (hr) | Melt viscosity before curing (poise) | Melt viscosity after curing (poise) | Whiteness | Amounts of PPS used (parts by weight) | Glass fibers Weight loss on heating (% by weight) | Glass fibers Amounts added (parts by weight) | Amounts of calcium carbonate added (parts by weight) | Tensile weld-strength (kg/cm$^2$) |
|---|---|---|---|---|---|---|---|---|---|---|---|---|
| | | | | | | viscosity | | | | | | |
| 4 | " | | — 2) | | 1550 | 1550 | 85 | " | " | " | " | 580 |
| 5 | PPS-I | Air | 230 | 6 | 570 | 4200 | 38 | " | 0.9 | 100 | 86 | 370 |
| 6 | PPS-III | Nitrogen | " | " | 270 | 890 | 77 | " | 0.4 | " | " | 360 |

1) not capable of melt-kneading and pelletizing due to the unduly high viscosity
2) not cured As can be seen from the above description of the invention, the present PPS compositions comprising a PPS resin cured in an inert gas and glass fibers showing a weight loss not greater than 0.7% by weight on heating are less liable to discoloration as compared with the conventional glass fiber-reinforced PPS resin compositions as well as exhibiting improved ductilities such as weld strength. Therefore, the present PPS compositions will perform to meet the requisites for use in production of electric and electronic parts, automotive parts and the like.

What is claimed is:

1. A poly(phenylene sulfide) resin composition which comprises:
   100 parts by weight of a poly(phenylene sulfide) resin that has been cured by heating it in a non-oxidative, inert gas in the absence of oxygen at temperatures within the range of from about 200° C. to about 270° C.; and
   10-200 parts by weight of glass fibers exhibiting a weight loss of not greater than 0.7% by weight when heated at a temperature of 330° C. for a period of 1 hour, and
   said poly(phenylene sulfide) resin having, before curing, a melt viscosity of not less than 400 poises as measured in a KOHKA type flow tester at a temperature of 300° C. and a load of 10 kg using a die of 0.5 mm diameter and 2.0 mm length.

2. A composition as claimed in claim 1 wherein said poly(phenylene sulfide) resin comprises about 70 mole % or more of structural units represented by the formula:

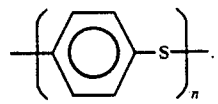

3. A composition as claimed in claim 2 wherein said poly(phenylene sulfide) resin comprises further 30 mole % or less of other copolymerized structural units.

4. A composition as claimed in claim 1 wherein said poly(phenylene sulfide) resin is blended with one or more polymers selected depending on the intended final application of said composition.

5. A composition as claimed in claim 1 which further comprises one or more additives and/or fillers commonly used in the conventional poly(phenylene sulfide) compositions.

6. A composition as claimed in claim 1 wherein said poly(phenylene sulfide) resin has, after curing, an increased melt viscosity of about 500-20,000 poises.

7. A method for preparing a poly(phenylene sulfide) resin composition less liable to discoloration and exhibiting excellent ductilities, which comprises the steps of:
   heating a poly(phenylene sulfide) resin in a non-oxidative, inert gas in the absence of oxygen at temperatures within the range of about 200°-270° C. so as to cure said resin, said resin having, before curing, a melt viscosity of not less than 400 poises as measured in a KOHKA type flow tester at a temperature of 300° C. and a load of 10 kg using a die of 0.5 mm diameter and 2.0 mm length; and
   mixing the cured resin with a glass fiber reinforcement exhibiting a weight loss of not greater than 0.7% by weight on heating at a temperature of 330° C. for a period of 1 hour, in relative proportions of 100 parts by weight of said resin and 10-200 parts by weight of said glass fiber reinforcement.

8. A method as claimed in claim 7 in which the heating step is conducted until the cured resin has an increased melt viscosity in the range of about 500-20,000 poises as measured under the conditions as defined above.

9. A method as claimed in claim 7 in which the heating step is conducted for a period of from about 10 minutes up to about 24 hours.

10. Moldings formed from the composition as claimed in any one of claims 1-6.

* * * * *